J. C. MUELLER.
COMBINED PROTECTOR AND GROWER FOR PLANTS.
APPLICATION FILED MAY 7, 1915.
1,254,260.
Patented Jan. 22, 1918.
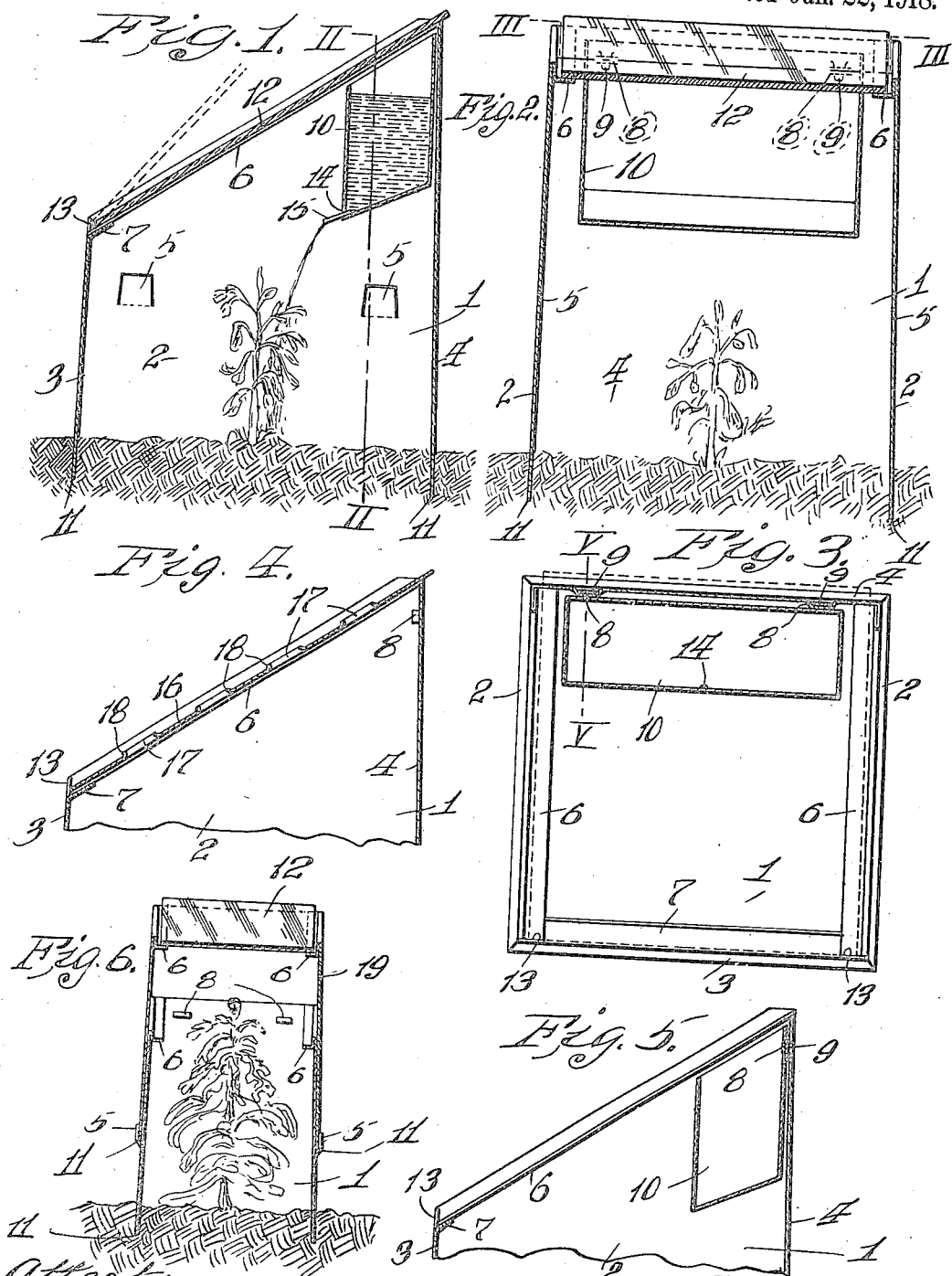

UNITED STATES PATENT OFFICE.

JOHN C. MUELLER, OF ST. LOUIS, MISSOURI.

COMBINED PROTECTOR AND GROWER FOR PLANTS.

1,254,260.  Specification of Letters Patent.  Patented Jan. 22, 1918.

Application filed May 7, 1915. Serial No. 26,655.

*To all whom it may concern:*

Be it known that I, JOHN C. MUELLER, a citizen of the United States of America, and a resident of the city of St. Louis and State of Missouri, have invented certain new and useful Improvements in Combined Protectors and Growers for Plants, of which the following is a specification.

One of the objects of this invention is to provide a plant protector with an improved light or glass securing portion so that the glass can be hurriedly dropped on the top of the casing of the protector, after which the glass will gravitate itself into a proper seating position.

Another object is to provide an auxiliary cover that is adapted to partially shade the growing plant and at the same time allow only a portion of the rain to have access to the plant.

A further object is to provide this improved plant protector with projecting portions so that one protector can be surmounted on another and rest on the projecting portions of the lower protector, thereby providing an inclosure of greater height to accommodate the growing plant.

A still further object is to provide this improved plant protector with a water reservoir in which water can be slowly fed to the plant.

Other and further objects will appear in the specification, and be specifically pointed out in the appended claims, reference being had to the accompanying drawings exemplifying the invention, and in which, Figure 1 is a vertical section taken through this improved plant protector.

Fig. 2 is a vertical section taken on the line II—II, Fig. 1.

Fig. 3 is a plan view, partly in section, taken on the line III—III, Fig. 2.

Fig. 4 is a fragmentary section taken through the upper portion of the protector, showing the improved auxiliary cover mounted thereon.

Fig. 5 is a fragmentary section taken on the line V—V, Fig. 3.

Fig. 6 is a vertical sectional view on a reduced scale, in which one protector is shown surmounted by another for the purpose of increasing the height of the closure.

Referring by numerals to the accompanying drawings: 1 designates a closure which comprises the side walls 2, front wall 3, and rear wall 4. Formed in each of the walls 2 are a pair of weakened portions 5, said portions being formed on the same horizontal plane. The top edge of each side wall 2 is inclined upwardly toward the rear wall 4, said edges being turned inwardly, and are adapted to form inclined ledges 6. The top edge 7 of the front wall 3 is also bent inwardly, and is given the same inclination as the aforesaid ledges. Formed in the rear wall 4, adjacent the top thereof, are a pair of struck-out portions 8, which are pressed inwardly, each of said portions 8 being for the reception of an engaging finger 9, said fingers being formed on the rear wall of a water reservoir 10.

This improved device is intended for hothouse plants and the like after they have been transplanted in open ground. In mounting this improved protector over a plant, the lower edges 11 of the closure are pressed into the ground, as shown more clearly in Figs. 1 and 2, and the light or glass 12 is then mounted on the inclined ledges 6. The upper portion of this improved protector is designed so as to simplify the mounting of the covers or lights 12, attention being called to the inclined ledges 6 and the abutting portions 13 which are formed on the front wall 3 adjacent the lower end of each ledge.

With this improved construction, the user need not be painstaking in mounting the covers 12, as the covers can be carelessly laid on the ledges, and after they are released, they will slide down the inclined ledges until the lower edge of the covers engage the abutting portions 13. From the aforesaid description, it is readily seen how a protector of this improved construction will save considerable labor in the mounting and demounting of the covers to and from the closures, as in the caring of transplanted plants, the covers have to be removed or replaced quite frequently in accordance with weather conditions.

As it has been found that water, when fed slowly to the growing plant, is more beneficial than if the water is hurriedly thrown on the plant, the water reservoir 10, which is adapted to be hung on one of the inside walls of the closure, when filled, will supply a drip feed to the plant through the opening 14, which is formed in the front wall of the reservoir adjacent the bottom thereof. If it is desired to regulate the size of the opening 14 in the reservoir, a plug 15 can be inserted in said opening.

In order to regulate the supply of light and heat to the plant, the cover 12 can be removed, and an auxiliary cover 16 can be mounted on the inclined ledges 6. This cover is preferably constructed of sheet metal, said cover having a series of outwardly punched openings 17, there being an upturned flange 18 formed around each of said openings. Said openings will allow enough light to enter the closure. If rainy weather sets in in the meantime, the greater amount of rain water will be shed from said openings. Whereas, if too much water enter the openings, the growing plant, on account of being surrounded by the closure, will become drowned.

The walls 2, 3 and 4 of this improved plant protector are preferably inclined inwardly and upwardly so that the sectional area across the top of the closure will be of lesser diameter than the bottom thereof. This construction provides for shipping and storing of a number of plant protectors as they can be telescoped one into the other.

This construction also provides means for providing a protector of greater height, in which connection the weakened portions 5, which are formed in the walls 2, are pressed outwardly, and one protector is mounted on top of the lower one. The lower edges 11 of the surmounting protector, which is indicated by 19, are engaged by the pressed out weakened portions 5. These portions 5 will sustain the protector 19 in elevated positions. This surmounting of one protector on top of another provides means for accommodating a plant when it has become too large for a single protector.

This improved protector is not only designed to protect plants from frosts, insects, animals, and the like, but is also to be used as a plant grower or invigorator, the glass or cover 12 resting on the ledges 6 making the device practically air-tight so that the temperature inside of the closure can be much higher than the temperature on the outside. The suspending of the water reservoir 10 inside of the closure is also considered to be a vast improvement in plant protectors, as with the reservoir, the duration of the watering of the plant is prolonged, which is much more beneficial to plants than if they were hurriedly watered.

What I claim is:

1. A plant protector comprising an open topped closure, said closure having side walls that taper upwardly and inwardly, weakened portions formed on said side walls, said weakened portions adapted to be pressed outwardly and upwardly to provide means for sustaining a similarly constructed closure when said second mentioned closure is mounted over said first mentioned closure.

2. A plant protector comprising an open topped closure, an inclined ledge formed on each side of a pair of opposing walls of said closure, said ledges being for the reception of a cover, an abutting portion formed on the front wall of said closure, said abutting portion adapted to prevent said cover from sliding off said ledges, said cover being provided with a plurality of openings, and an upturned flange surrounding each of said openings of said cover, said flanges adapted to turn a flow of water away from said openings.

3. A plant protector having a pair of walls, each of said walls having their upper edges inclined in the same direction, each of said walls having their upper portions bent on themselves, each of said bent portions having a right angled portion formed thereon, said right angled bent portions forming ledges for the reception of a removably mounted cover.

JOHN C. MUELLER.

In the presence of—
  M. C. Hammon,
  H. G. Fletcher.

Copies of this patent may be obtained for five cents each, by addressing the "Commissioner of Patents, Washington, D. C."